United States Patent [19]

Nasiri

[11] 4,433,898

[45] Feb. 28, 1984

[54] FIBER OPTIC ASSEMBLY FOR COUPLING AN OPTICAL FIBER AND A LIGHT SOURCE

[75] Inventor: Saeed Nasiri, San Jose, Calif.

[73] Assignee: National Semiconductor Corporation, Santa Clara, Calif.

[21] Appl. No.: 219,076

[22] Filed: Dec. 22, 1980

[51] Int. Cl.³ ............................................. G02B 7/26
[52] U.S. Cl. ................ 350/96.17; 350/96.18; 350/96.20
[58] Field of Search ............... 250/227; 357/17; 350/96.17, 96.18, 96.20

[56] References Cited

U.S. PATENT DOCUMENTS

| 4,186,996 | 2/1980 | Bowen et al. | 350/96.20 |
| 4,192,574 | 3/1980 | Henry et al. | 350/96.17 |
| 4,257,672 | 3/1981 | Balliet | 350/96.20 X |
| 4,265,511 | 5/1981 | Nicia et al. | 350/96.20 X |
| 4,269,648 | 5/1981 | Dakss et al. | 350/96.18 X |
| 4,274,707 | 6/1981 | Pacey et al. | 350/96.20 |
| 4,279,465 | 7/1981 | Vojvodich | 350/96.20 |

FOREIGN PATENT DOCUMENTS 10352 4/1980 European Pat. Off. ......... 350/96.20

*Primary Examiner*—John D. Lee
*Assistant Examiner*—Frank González
*Attorney, Agent, or Firm*—Michael J. Pollock; Paul J. Winters; Gail W. Woodward

[57] ABSTRACT

A heat molded optical fiber interconnect molds one end of a plastic optical fiber around light emitting surfaces of a light source such as a light emitting diode to provide a highly efficient optical and mechanical coupling between the optical fiber and the light source. In one preferred embodiment an efficient interconnect for coupling large diameter optical fibers has a converging lens heat molded in the other end of the plastic optical fiber to efficiently couple light to another optical fiber or receiver.

15 Claims, 17 Drawing Figures

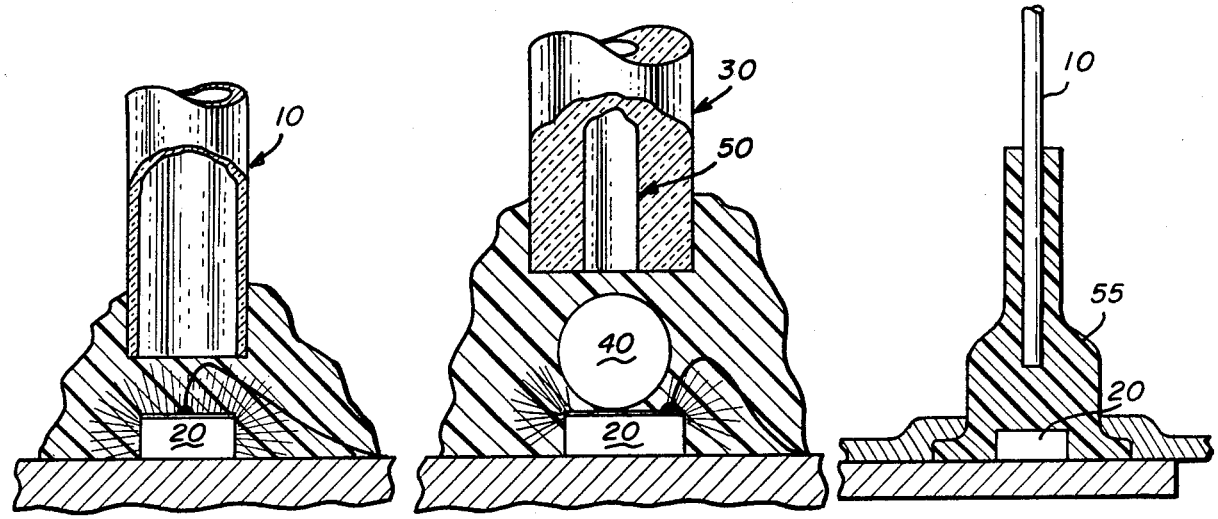
Fig_1A (PRIOR ART)  Fig_1B (PRIOR ART)  Fig_1C (PRIOR ART)
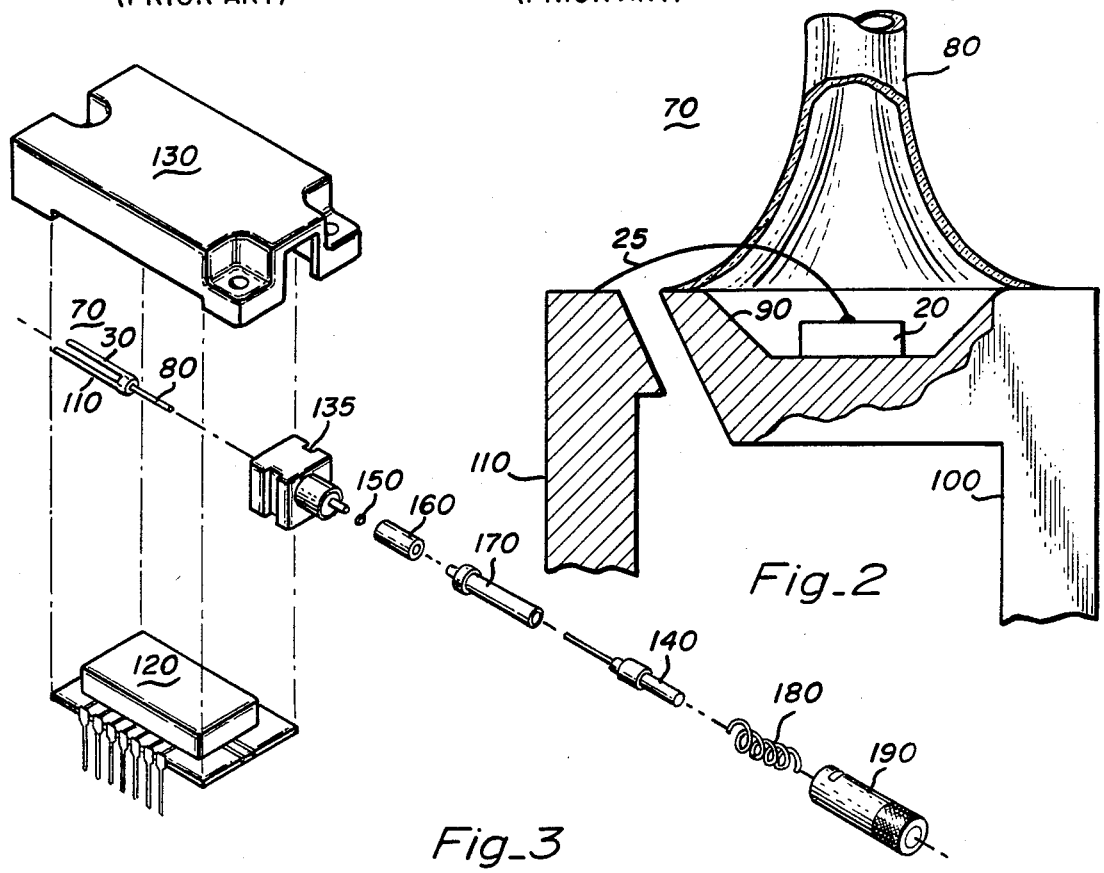
Fig_2
Fig_3

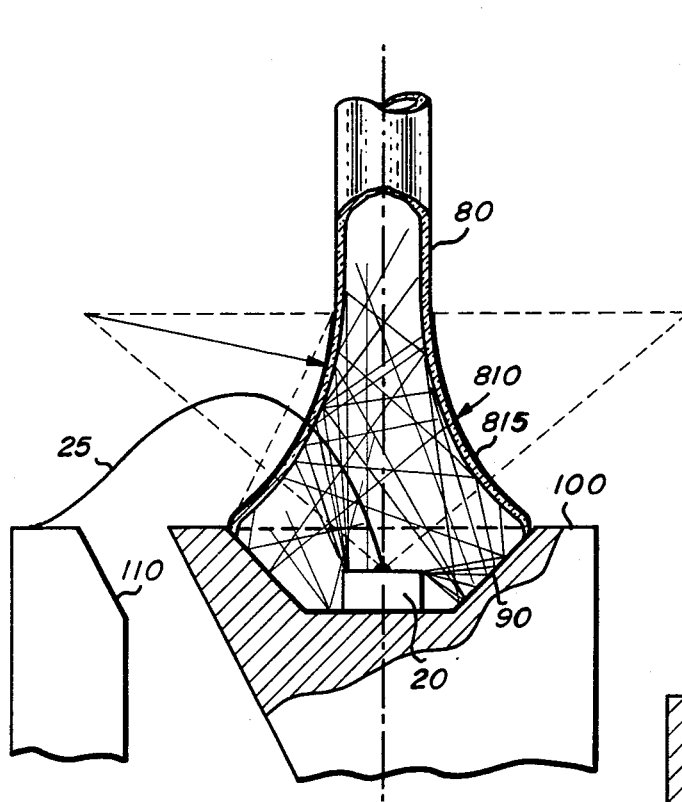
Fig_8
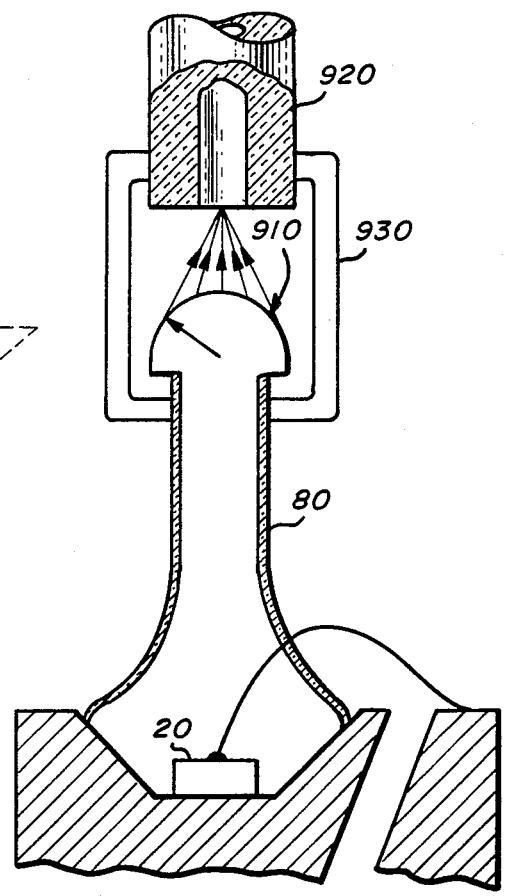
Fig_9
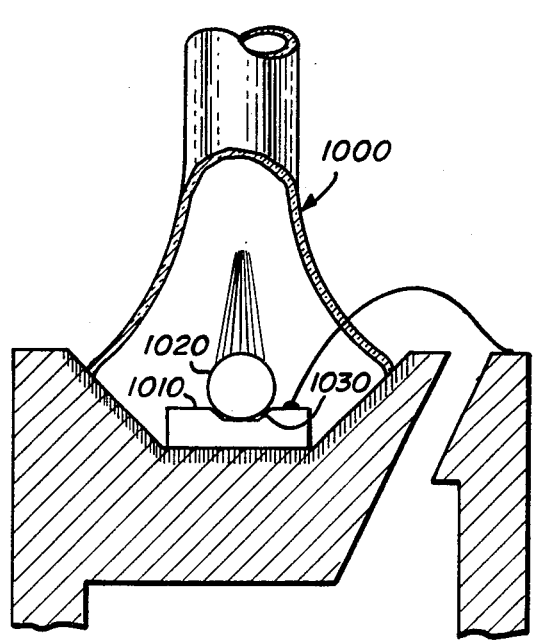
Fig_10
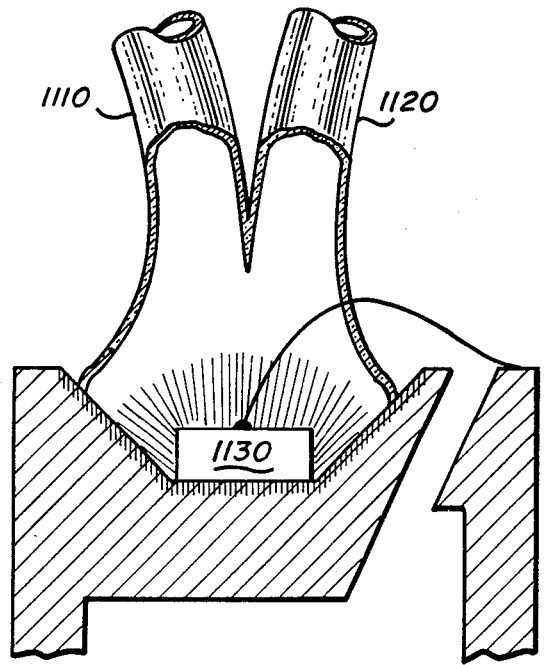
Fig_11

FIBER OPTIC ASSEMBLY FOR COUPLING AN OPTICAL FIBER AND A LIGHT SOURCE

BACKGROUND OF THE INVENTION

1. Field of the Invention

The present invention relates generally to optical fiber interconnects. More specifically, the preferred embodiment of the present invention is related to heat molding a plastic optical fiber to a light emitting diode.

2. Description of the Prior Art

Two types of optical fibers are currently in general use. First, "large diameter" plastic optical fibers having a diameter of approximately 14 mills with an additional cladding of approximately one mill are used for short transmission path lengths. "Small diameter" optical fibers having a silica or a glass inner core of approximately 8 mil diameter have a relatively thick cladding giving an overall diameter of approximately 26 mils. This second type of optical fiber has an attenuation characteristic substantially smaller than that of plastic optical fibers, thus is more suitable for long transmission path lengths. However, due to the small diameter of the optically transmissive core of silica and glass optical fibers, it is much more difficult to efficiently couple and launch sufficient power from a light source into the silica or glass optical fibers. This difficulty in coupling has been a serious disadvantage in the use of small diameter optical fibers in commercial applications.

Laser diodes can be constructed to confine the active light emitting region to a narrow 2-3 mm wide stripe that can be axially coupled into small optical fibers with high efficiency. However, this has not been the case for LED's which characteristically have larger light emitting surfaces and often have light emitting side surfaces. LED's have a long operational lifetime, are simple to use, and are less temperature sensitive than laser diodes. Accordingly, it is desirable to efficiently couple LED's to small diameter optical fibers.

It has proven to be no easy task to align two fibers, or a light source and a fiber, with enough precision to allow the light from one to enter the other efficiently. Most prior art interconnects are chiefly concerned with a close, end-to-end mating and precise alignment. These interconnects can be divided into two types, those that mount optical fibers to the light source with epoxy—the "wet" interconnects—and those using aligning rods, pins, or grooves without epoxy, —the "dry" interconnects.

Epoxy-based wet interconnects make good use of low-cost materials such as plastic-clad silica fibers and plastic connector housings. However, the manufacture of these interconnects is usually labor-intensive, time consuming and expensive. Special fixtures are often required to align the interconnect and a technician must wait for the epoxy to set thoroughly before the fiber can be processed further.

The most popular alignment mechanism for dry interconnects consists of a series of small rods or pins inside a metal sheath. The optical fiber is inserted and held in a narrow space between the rods. A good review of both wet and dry fiber optic interconnects can be found in "FIBER OPTICS GROWING STRONG," Ohr and Adlerstein, Electronic Design 23, Nov. 8, 1979.

The prior art in coupling plastic or glass core optical fibers to light sources such as light emitting diodes (LED's) typically involves mechanical alignment and clamping of the optical fiber to the light emitting diode. FIG. 1 illustrates three methods used in the prior art to couple optical fibers to light emitting diodes. In FIG. 1A an optical fiber 10 has been epoxied in alignment with a light emitting diode LED 20. In FIG. 1B a silica core optical fiber 30 is coupled to a LED 20 in combination with a spherical lens 40 to converge light from LED 20 to the small silica core 50 of optical fiber 30 and epoxy to hold spherical lens 40, and optical fiber 30 in alignment. FIG. 1C illustrates a dry interconnect having an optical fiber 10 mechanically aligned to an LED 20 by a crimp-on connector 55. Note that the end of optical fiber 10 is held apart from LED 20 to prevent deterioration of the optical surfaces resulting from their rubbing together and scratching.

There are several disadvantages to these prior art methods. First, there are undesirably large light losses associated with the optical coupling between the LED and the optical fiber. This light loss is caused by a number of factors including misalignment between the optical fiber and the light emitting diode, the necessary spacing between the optical fiber and the LED and difficulties in converging the light from the LED into the receptive cone of the optical fiber, especially where the optical fiber is a small diameter silica or glass. A practical difficulty related to coupling optical fibers to LED's is the time and expense required in the alignment and coupling process. These disadvantages and difficulties in current methods for coupling optical fibers to LED's have been limiting factors in the use of optical fibers in electrical-optical circuits.

A major cause of these difficulties arises from the fact that it is difficult to abut the optical fiber to the LED without damaging the wire bond attached to the surface of the LED or causing a deterioration in the optical surfaces. The optical fiber must be suspended away from, but held in alignment with the LED during the coupling process. This gap between the LED and the end of the optical fiber is not only a major cause of attenuation in itself, it also gives rise to misalignment and difficulties in mechanical coupling.

SUMMARY OF THE INVENTION

An optical fiber interconnect assembly comprises a plastic optical fiber having one end heat-molded to encapsulate the light emitting surfaces of a light emitting diode or another light source for providing an efficient optical and secure mechanical coupling between the light source and the plastic optical fiber.

In one preferred embodiment of the present invention the other end of the plastic optical fiber is either heat molded to form a lens or abutted to a spherical lens to converge light from the fiber into an aligned glass or silica core optical fiber for providing an efficient coupling from the light source to the smaller diameter glass or silica core optical fiber.

BRIEF DESCRIPTION OF THE FIGURES

FIGS. 1A-C illustrate three prior art optical fiber interconnects. FIGS. 1A and 1B illustrate wet interconnects and FIG. 1C illustrates a dry crimp-on interconnect.

FIG. 2 is a cross section of a cupped LED lead frame having a LED coupled to a plastic optical fiber in accordance with a preferred embodiment of the present invention.

FIG. 3 is an exploded view of an optical transmitter assembly incorporating the preferred embodiment of the present invention.

FIG. 8 is a cross section illustration of an optical fiber heat molded to encapsulate a light emitting diode.

FIG. 9 is a cross section of an optical fiber having one end heat formed in the shape of a converging lens.

FIG. 10 is a cross section of an optical fiber heat molded to encapsulate a light emitting diode and a spherical lens.

FIG. 11 is a cross section of an alternative embodiment wherein two optical fibers are both heat molded to encapsulate a light emitting diode.

DETAILED DESCRIPTION OF THE PREFERRED EMBODIMENT

Figure 4:
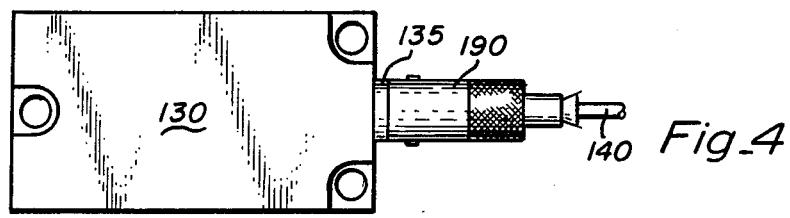
FIG. 4 is a top view of the optical transmitter assembly of FIG. 3.

FIG. 2 is a cross section side-view of a cupped LED lead frame 70 having a LED 20 coupled to a plastic optical fiber 80 in accordance with a preferred embodiment of the present invention. LED 20 is constructed from a semiconductor chip which, from the top, is square and approximately 14 mils per side. LED 20 has its back plane electrically and mechanically coupled to a reflective surface 90 formed in a first conductive die attach post 100. Reflective surface 90 is generally concave in shape to direct light towards plastic optical fiber 80. A terminal on the active surface of LED 20 is coupled by a wire bond 25 to a second conductive die attach post 110. Plastic optical fiber 80 is heat molded to LED 20 to completely encapsulate the top light emitting and other exposed surfaces of the LED and to encapsulate a portion of wire bond 25.

One advantage of the present invention is that it eliminates any gap or material between the plastic optical fiber and the light source. This results in an increased efficiency of the transmission of light from the light source to the plastic optical fiber. The generally concave shape of reflective surface 90 also serves to couple more of the light from LED into optical fiber 80.

FIG. 3 is an exploded view of an optical transmitter assembly incorporating the preferred embodiment of the present invention. A hybrid package 120 mounts to housing cover 130 and a cupped LED lead frame 70 having an LED heat molded to a plastic optical fiber 80. Optical fiber 80 is aligned with a male receptacle housing 135. A spring loaded bayonet mount selectively couples glass optical fiber 140 in alignment with plastic optical fiber 80. Specifically, a spherical ruby-saphire synthetic lens 150 having a one millimeter diameter is abutted to one end of plastic optical fiber 80. When coupled, the proximate end of glass optical fiber 140 is spaced away from spherical lens 150 by a distance approximately equal to the focal length of the lens, preferably about 25 mils. The spherical lens focuses the light from plastic optical fiber 80 to one end of the smaller diameter glass optical fiber 140.

A bushing 160, female receptacle 170, spring 180 and bayonet coupling 190 complete the bayonet type coupling used in the illustrated preferred embodiment.

Figure 5:
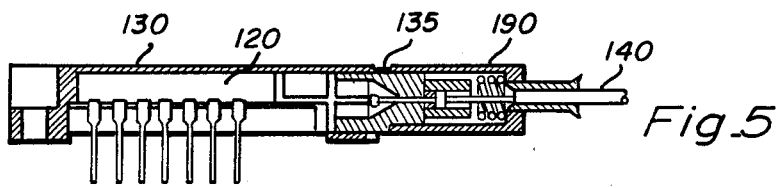
FIG. 5 is a side view of the optical transmitter assembly of FIG. 3.
Figure 6:
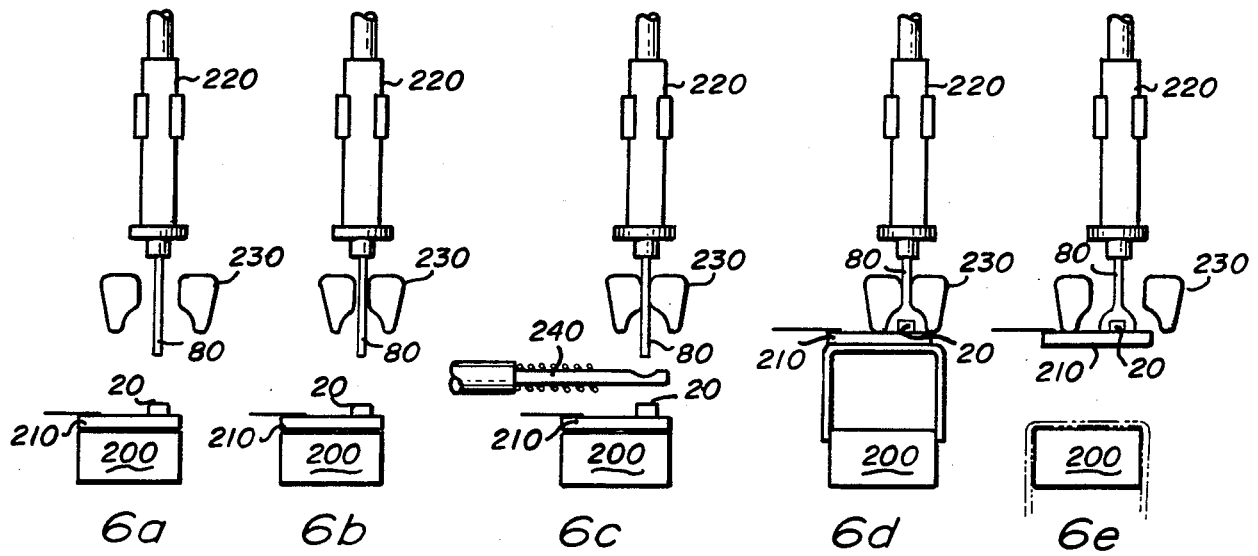
FIGS. 6a-6e illustrate fiber optic molding equipment and one method of heat molding a plastic optical fiber to a LED as illustrated in FIG. 2.

FIGS. 4 and 5 show top and side views respectively of the optical transmitter assembly in a coupled configuration. FIGS. 6a through 6e illustrate a simple apparatus and method for heat molding plastic optical fiber 80 to LED 20. In FIG. 6a a heater block 200 is placed in close thermal contact with a base 210 to raise the temperature of base 210 and LED 20 mounted on the base to a temperature sufficient to melt the plastic optical fiber. Clamping and alignment fixture 220 holds the plastic optical fiber 80 in alignment with LED 20 in preparation for heat molding plastic optical fiber 80 to LED 20. FIG. 6b illustrates the clamping of die 230 to plastic optical fiber 80. Die 230 defines the form of the outer surface of the plastic optical fiber 80 and restricts the flow of plastic so that the fiber molds more accurately to the contours of LED 20. Further, it maintains the original shape of the fiber near the heat molded end during the molding process. For this purpose die 230 has a total length of approximately 100–300 mils beyond the heat molded region which keeps the fiber from deforming in this region. FIG. 6c illustrates the insertion of a radiant heater 240 between plastic optical fiber 80 and LED 20 to heat the light emitting surfaces of LED 20 and the end of the plastic optical fiber 80 to be bonded to a temperature sufficient to cause the plastic to start to flow within die 230. When the end of plastic optical fiber 80 to be bonded and the exposed surfaces of LED 20 have both reached a temperature sufficient to melt the plastic optical fiber, radiant heater 240 is removed from between plastic optical fiber 80 and LED 20 and the plastic optical fiber 80 is pressed against LED 20. The temperature of the end of plastic optical fiber 80 and the light emitting surfaces of LED 20 is sufficient to cause the plastic optical fiber to flow and mold to the exposed surfaces of the LED 20. The outer surface of the plastic optical fiber molds to the shape of the inside of die 230 in a new configuration completely encapsulating the light emitting and other exposed surfaces of LED 20. Once sufficient time has elapsed to allow the optical fiber to flow into the molding cavity, heater block 200 is removed from close thermal contact with base 210 and LED 20 as illustrated in FIG. 6d, allowing the bond to cool. FIG. 6e illustrates the unclamping of die 230 from the now heat molded plastic optical fiber 80 and LED 20. It should be noted that characteristically there is a wire bond 25 coupling the light emitting diode to another lead bond post or terminal and that by heat molding a plastic optical fiber to the light emitting diode this conductive wire is not only left intact but is completely encapsulated to create an additional strong mechanical bond between the plastic optical fiber and the light emitting diode and a protection of the wire bond from any damage. Further, by completely encapsulating the light emitting surfaces of LED 20 with the molded plastic optical fiber, an additional amount of light is launched into the plastic optical fiber. In the preferred embodiment, die 230 has a slit which is aligned with wire bond 25 so that the wire bond is not damaged or deformed during the bonding operation.

Figure 7:
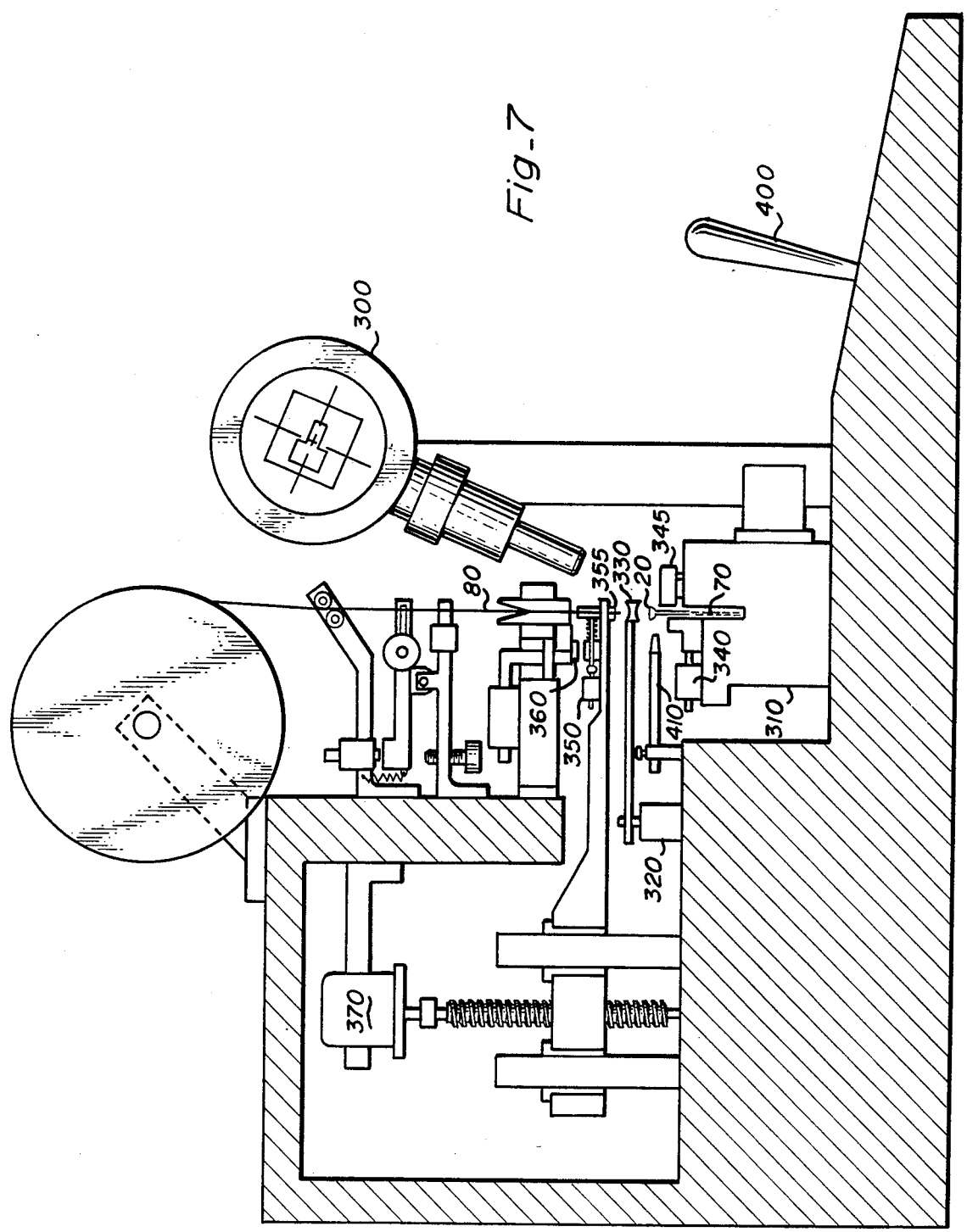
FIG. 7 illustrates automated fiber optic molding equipment for heat molding plastic optical fibers.

FIG. 7 illustrates a highly automated workstation for heat molding plastic optical fibers to light emitting diodes. Specifically, microscope 300 allows an operator to align lead frame indexer 310, having lead frame 70 and light emitting diode 20 mounted thereupon, in alignment with optical fiber 80. Activation of solenoid 320 causes radiant heater 330 to swing out into close proximity to LED 20 in cupped LED lead frame 70 and to one end of plastic optical fiber 80. Solenoid 340 then clamps the sides of cupped LED lead frame 70 to heater block 345 and causes LED lead frame 70 and LED 20 to heat. Solenoid 350 is then activated to clamp die 355 to plastic optical fiber 80. As the end of plastic optical fiber 80 and LED 20 heat up, a carbide blade 360 cuts off a pre-selected length of plastic optical fiber. Preferably, this length is approximately 300 mils. The alignment of the fiber to the LED can be adjusted by observation of the LED through microscope 300 and adjustment of the X-Y position of lead frame indexer 310 by the use of manual control handle 400. Radiant heater 330 is then moved aside and stepper motor 370 is activated to abut the heated end of plastic optical fiber 80 to the heated LED 20. Heater 345 is then turned off and air cooler 410 blows air on the LED/optical fiber assembly to cool the plastic. The equipment is then free to advance another length of fiber and advance another lead frame into lead frame indexer 310 to start another bonding operation.

FIG. 8 is a cross section illustration of optical fiber 80 heat molded to encapsulate the light emitting and other exposed surfaces of light emitting diode 20. An outer surface 810 of the end of optical fiber 80 heat molded to light emitting diode 20 is heat molded to a generally concave cross section. This shape results in an increased amount of light from the diode being coupled into the optical fiber. Outer surface 810 preferably has a radius of 3/64 inch and may be heat molded by die 355 having a conforming inner surface. Optionally, a reflective surface 815 can be applied to outer surface 810 to further increase the light coupled into the optical fiber.

FIG. 9 is a cross section illustration of an optical fiber 80 having a converging lens 910 formed in one end by heat molding that end in a suitable die tool. The die tool is heated to a temperature sufficient to melt the optical fiber, the optical fiber is pressed into the die tool, and the optical fiber and the die tool are cooled prior to removal of the optical fiber, thus causing the end of the optical fiber to heat mold to the shape of the die tool. Another optical fiber 920 and optical fiber 80 are held by housing 930 with one end of optical fiber 920 at the focal point of converging lens 910. Specifically, in the preferred embodiment, optical fiber 80 is a plastic fiber having a 16 mil diameter and converging lens 910 has a radius of 12 mil and a focal length of 25 mils from the center of the lens. Optical fiber 920 is preferably a glass fiber having an 8 mil diameter inner core.

FIG. 10 is a cross section of an alternative embodiment of the present invention wherein an optical fiber 1000 is heat molded to encapsulate a light emitting diode 1010 and a spherical converging lens 1020. Light emitting diode 1010 is constructed so as to emit light from etched well emitting surface 1030. Spherical lens 1020 is placed partially into the etched well for converging light from the diode into the optical fiber. The optical fiber 1000 is heat molded to exposed surfaces of the LED as well as to the light-emitting surfaces of the LED/lens combination. Thus, the molded assembly molds the LED, the lens and the fiber into the desired position. And, no adhesive or other undesirable material is required to bond the lens to the diode.

FIG. 11 is a cross section of an alternative embodiment wherein two optical fibers 1110 and 1120 are both heat molded to encapsulate a light emitting diode 1130. In this embodiment light from LED 1130 is efficiently and directly coupled to two optical fibers. One use for this embodiment is to couple one of the fibers into a feedback path.

While the invention has been particularly taught and described with reference to the preferred embodiments, those versed in the art will appreciate that minor modifications in form and detail may be made without departing from the spirit and scope of the invention. For example, the present invention could be used in optical transceivers having a LED mounted on a PIN diode receiver and many types of alternative light sources and optical fibers could be used. Accordingly, all such modifications are embodied within the scope of this patent as properly come within my contribution to the art and are particularly pointed out by the following claims.

I claim:

1. A method for heat molding a plastic optical fiber to a light source having a light emitting surface and mounted to a base, the method comprising the steps of:
   heating the light source;
   heating one end of the plastic optical fiber;
   aligning the heated one end of the plastic optical fiber with the heated light source;
   abutting the heated one end of the plastic optical, fiber against the heated light source to encapsulate the light emitting surface of the light source in plastic optical fiber; and
   cooling the plastic optical fiber and the light source.

2. A method for heat molding a plastic optical fiber to a light source as in claim 1 further comprising the step of:
   restricting the flow of the plastic to heat mold the outer shape of the one end of the plastic optical fiber.

3. A method for heat molding a plastic optical fiber to a light source as in claim 1 wherein the heated one end of the plastic optical fiber encapsulates the exposed surfaces of the light source.

4. A method for heat molding a plastic optical fiber to a light source as in claim 1 wherein the outer shape of the one end of the plastic optical fiber is heat molded to a concave cross section.

5. A method for heat molding a plastic optical fiber to a light source as in claim 1 further comprising the step of forming a reflective coating on the outer surface of the one end of the plastic optical fiber.

6. A method for heat molding a plastic optical fiber to a spherical lens positioned partially in an etched well of a light emitting diode, the method comprising the steps of:
   heating the light emitting diode;
   heating one end of the plastic optical fiber;
   aligning the heated one end of the plastic optical fiber with the heated light emitting diode;
   abutting the heated one end of the plastic optical fiber against the heated light emitting diode to encapsulate the exposed surface of the spherical lens; and
   cooling the plastic optical fiber, the spherical lens and the light emitting diode.

7. A method as in claim 6 further comprising the step of restricting the flow of the plastic to heat mold the outer shape of the one end of the plastic optical fiber.

8. A method as in claim 6 wherein the heated one end of the plastic optical fiber encapsulates the exposed surfaces of the light emitting diode.

9. A method as in claim 6 wherein the outer shape of the one end of the plastic optical fiber is heat molded to concave cross section.

10. A method as in claim 6 further comprising the step of forming a reflective coating on the outer surface of the one end of the plastic optical fiber.

11. A method or heat molding two plastic optical fibers to a light source having a light emitting surface and mounted to a base, the method comprising the steps of:
- heating the light source;
- heating one end of each of the plastic optical fibers;
- aligning the heated ends of the plastic optical fibers with the heated light source;
- abutting the heated ends of the plastic optical fibers against the heated light source to encapsulate the light emitting surface of the light source in plastic optical fibers; and
- cooling the plastic optical fibers and the light source.

12. A method for heat molding plastic optical fibers to a light source as in claim 11 further comprising the the step of:
- restricting the flow of the plastic to heat mold the outer shape of the one end of the plastic optical fibers.

13. A method for heat molding a plastic optical fiber to a light source as in claim 11 wherein the heated one end of the plastic optical fibers encapsulate the exposed surfaces of the light source.

14. A method for heat molding a plastic optical fiber to a light source as in claim 11 wherein the outer shape of the one end of the plastic optical fibers are heat molded to a concave cross section.

15. A method for heat molding a plastic optical fiber to a light source as in claim 11 further comprising the step of forming a reflective coating on the outer surface of the one end of the plastic optical fibers.

* * * * *